United States Patent
Kovishaner

(10) Patent No.: US 11,068,432 B1
(45) Date of Patent: Jul. 20, 2021

(54) MANAGING ADDRESSES IN A NETWORK DEVICE WITH A REGISTER-BASED BUFFER HAVING AN ODD NUMBER OF STORAGE LOCATIONS

(71) Applicant: Marvell Israel (M.I.S.L) Ltd., Yokne'am (IL)

(72) Inventor: Gregory Kovishaner, Ramat-Gan (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 98 days.

(21) Appl. No.: 16/526,366

(22) Filed: Jul. 30, 2019

Related U.S. Application Data

(60) Provisional application No. 62/712,816, filed on Jul. 31, 2018.

(51) Int. Cl.
  *G06F 13/42* (2006.01)
  *G06F 3/06* (2006.01)
  *G06F 8/52* (2018.01)
  *G06F 9/54* (2006.01)

(52) U.S. Cl.
  CPC ........ *G06F 13/4239* (2013.01); *G06F 3/0607* (2013.01); *G06F 3/0656* (2013.01); *G06F 3/0658* (2013.01); *G06F 3/0679* (2013.01); *G06F 8/52* (2013.01); *G06F 9/544* (2013.01)

(58) Field of Classification Search
  None
  See application file for complete search history.

(56) References Cited

U.S. PATENT DOCUMENTS

| | | | | |
|---|---|---|---|---|
| 6,604,169 B2* | 8/2003 | Catherwood | ............ | G06F 7/72 711/110 |
| 6,934,198 B1* | 8/2005 | Lowe | ........................ | G06F 5/14 365/189.05 |
| 8,417,982 B1* | 4/2013 | Amit | .................... | G11C 7/1006 713/400 |
| 8,922,573 B1* | 12/2014 | Choudhary | ............... | G06T 1/60 345/547 |

FOREIGN PATENT DOCUMENTS

WO   WO-2009121421 A1 * 10/2009 ............ H04J 3/0697

* cited by examiner

*Primary Examiner* — Farley Abad
*Assistant Examiner* — Dayton Lewis-Taylor

(57) ABSTRACT

Implementations described herein provide apparatus and methods for storing data in, and retrieving data from, storage buffer having an odd number of storage locations using minimal additional logic. A binary address symbol with a maximum value of one less than twice the number of storage locations is used to allow use of Gray code in transferring the storage location pointers between clock domains. An offset value is added to the binary address symbol to further facilitate use of Gray code. The Gray code is converted back to a binary symbol at the read side, the offset value is subtracted therefrom, and a pointer to a particular storage location is resolved.

22 Claims, 3 Drawing Sheets

MANAGING ADDRESSES IN A NETWORK DEVICE WITH A REGISTER-BASED BUFFER HAVING AN ODD NUMBER OF STORAGE LOCATIONS

CROSS REFERENCE TO RELATED APPLICATION

This claims the benefit under 35 U.S.C. § 119(e) of U.S. Provisional Patent Application No. 62/712,816, filed Jul. 31, 2018, which is hereby incorporated by reference herein in its entirety.

FIELD OF USE

This disclosure relates to storage of data in, and retrieval of data from, a storage buffer having an odd number of storage locations and accessible by components in different clock domains.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In designing a chip having two different clock domains, a storage buffer such as an asynchronous first-in/first-out storage buffer (FIFO), is used to allow data transfer between the clock domains. To reduce gate count and power consumption, the number of storage locations in the storage buffer is selected to support a desired data transfer rate without being subjected to back pressure from the storage buffer (i.e., without attempting to write data to the storage buffer faster than data is read out of the storage buffer). The needed data transfer rate is calculated based on the clock frequencies of the two clock domains and the operating conditions for the particular application in which the chip will be deployed. In some cases, the optimal number of storage locations is an odd number. Solutions for controlling access to a storage buffer, such as an asynchronous FIFO, having an odd number of storage locations, typically require a significant amount of additional resources.

SUMMARY

Implementations described herein provide an apparatus and method for storing data units in a network device having a plurality of clock domains. A data unit is received from a client device disposed in a first clock domain for access by a device disposed in a second clock domain operating asynchronously from the first clock domain. An addressable storage location of a storage buffer having an odd number of storage locations is selected, the addressable storage location having a corresponding binary address symbol. The storage locations of the storage buffer are selected sequentially as data units are received for storage therein.

An offset value is determined based on the number of storage locations in the storage buffer, and the sum of the binary address symbol and the offset value is converted to a corresponding Gray code symbol. The Gray code symbol is the transferred from the first clock domain to the second clock domain.

To select the addressable storage location of the storage buffer, the value of the binary address symbol is retrieved, wherein the binary address symbol is a zero-based binary number. If the value of the binary address symbol is greater than or equal to the number of storage locations in the storage buffer, the difference of the value of the binary address symbol and the number of storage locations in the storage buffer is calculated and the addressable storage locations corresponding to the resulting value is selected. If the value of the binary address symbol is less than the number of storage locations in the storage buffer, then the addressable storage location corresponding to the value of the binary address symbol is selected.

The data unit is stored in the selected addressable storage location. After storage of the data unit, the value of the binary address symbol is incremented by one. If the incremented value of the binary address symbol is greater than one less than twice the number of storage locations in the storage buffer, then the value of the binary address symbol is reset to zero.

Once received in the second clock domain, the Gray code symbol is converted to a reconstructed binary address symbol. The offset value is then subtracted from the reconstructed binary address symbol. A signal is asserted from the second clock domain indicating the number of available storage locations from which data can be read. A read request comprising a particular binary address symbol may be received from a component in the second clock domain. If the value of the particular binary address symbol is greater than or equal to the number of storage locations in the storage buffer, then data is read from the storage location corresponding to the difference of the value of the particular binary address symbol and the number of storage locations in the storage buffer. If the value of the particular binary address symbol is less than the number of storage locations in the storage buffer, then data is read from the storage location corresponding to the value of the particular binary address symbol.

The Gray code symbol may be transferred from the first clock domain to the second clock domain using a control channel. For example, a synchronization channel or other data path between the first clock domain and the second clock domain may be used to transfer the Gray code symbol between clock domains. The offset value may also be similarly transferred between clock domains, or independently calculated in each clock domain.

The determine the offset value, the smallest power of two that is greater than the number of storage locations in the memory buffer is determined. The number of storage locations is then subtracted from the power of two to determine the offset value.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
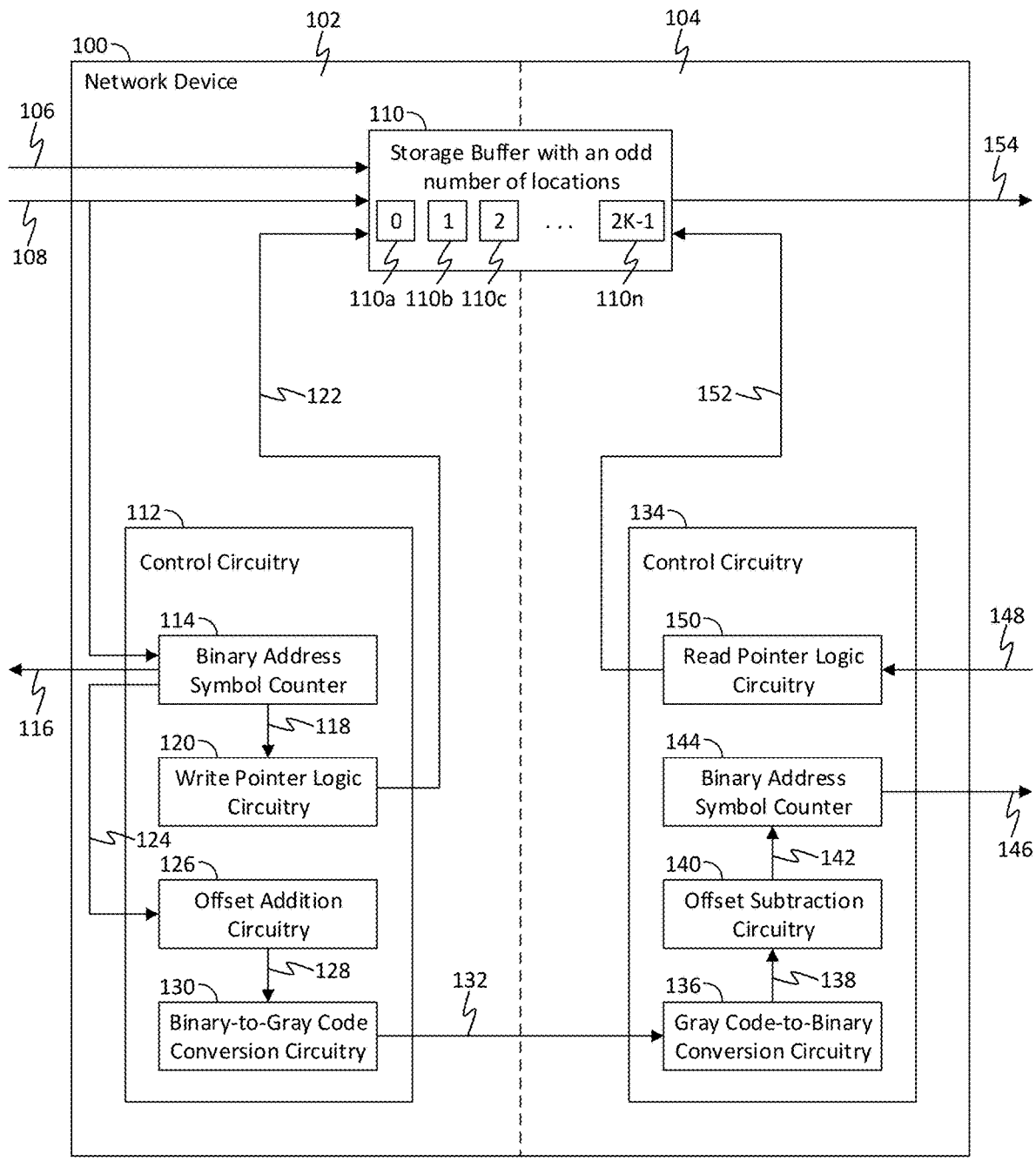
FIG. 1 is a block diagram illustrating components of a device and data flow therebetween for writing data to, and reading data from, the storage buffer in accordance with some implementations of the subject matter of the present disclosure.

Implementations described herein provide an apparatus and methods for storing data in, and retrieving data from, a storage buffer with an odd number of storage locations. Data to be written into the storage buffer is received by receiving circuitry residing in a first clock domain (the "write side") and stored at a storage location in the storage buffer. Each storage location in the storage buffer has a binary address symbol corresponding to the respective location. The binary address symbol (e.g., a binary representation of an integer N corresponding to the $N^{th}$ storage location) is converted to a corresponding Gray code symbol and transferred to a second clock domain from which the data will be read (the "read side"). At the read side, the Gray code symbol is converted back to the corresponding binary address symbol. Read-side control circuitry, using the binary address symbol, calculates a number of storage locations available for reading and then, if the number of storage locations available for reading is greater than zero, transfers the data from the storage location in the storage buffer to other components residing in the second clock domain.

As Gray code is a cyclic code requiring use of an even number of symbols, additional logic circuitry is used in some implementations to manage the binary address symbol and to use the binary address symbol to store data in, or read data from, a specific storage location of the storage buffer. The value of the binary address symbol may have a maximum value that is one less than twice the number of memory locations, where the binary address symbol is a zero-based value. For example, if the storage buffer contains nine storage locations, the value of the binary address symbol can be between zero and seventeen. Thus, although the storage buffer has an odd number of locations, the logic circuitry can treat the storage buffer as having twice as many locations (i.e., an even number of locations), which is converted to a corresponding Gray code symbol to transfer the binary address symbol between clock domains. The logic circuitry may determine the storage location corresponding to the binary address symbol by subtracting the number of storage locations from the binary address symbol when the binary address symbol is greater than or equal to the number of storage locations in the storage buffer. For example, if the storage buffer contains nine storage locations and the binary address symbol is 1011, the binary representation of the number 11, the logic circuitry subtracts nine from the binary address symbol, resulting in a storage location of two.

Each time data is written to a storage location the binary address symbol is incremented by one. If the binary address symbol is equal to twice the number of storage locations, the binary address symbol is reset to zero.

When a read request is received in the second clock domain, similar processes are performed to determine the storage location from which data is being requested from a binary address symbol contained in the request.

Many devices, such as network switches and other data transfer and/or routing devices, contain portions or subsets of components which operate in different clock domains having different operational frequencies. To pass data between clock domains in a reliable way, such devices typically employ a storage buffer such as a register-based asynchronous first-in/first-out (FIFO) storage buffer. Data is received in one clock domain, written to a storage location in the storage buffer, and read by a component in a second clock domain.

To store data in, or access data from, a storage location in the storage buffer, a pointer (i.e., a virtual memory address) corresponding to a particular location is used when performing either a write or read operation. The pointer to the storage locations containing data written into the storage buffer must be shared from the first clock domain to the second clock domain so that components in the second clock domain can calculate a number of locations currently available for reading and thus, a read request can be addressed to the correct storage location. Likewise, the pointer to the storage locations from which data has been read must be shared from the second clock domain to the first clock domain, enabling components in the first clock domain to calculate a number of locations currently available for writing, so that new data can be written to the storage buffer without compromising data that has not yet been read. To share a pointer, a binary address symbol is converted to a corresponding Gray code symbol. However, in some devices the storage buffer contains an odd number of storage locations. Due to the nature of Gray code, an even number of symbols must be used. Thus, in implementations described below, additional logic is included in the device to manage the pointers (virtual memory addresses).

Implementations of the subject matter of the present disclosure allow for the use of Gray code with a storage buffer having an odd number of locations. The storage buffer is treated as having twice as many (i.e., an even number) of storage locations, and storage locations can be properly addressed with only a minimal amount of additional logic.

For example, if the storage buffer contains nine storage locations, the buffer is treated as having eighteen storage locations. In such an implementation, storage locations in the storage buffer are used sequentially. A binary address symbol is used to represent each respective storage location. The maximum value of the binary address symbol is one less than twice the number of storage location in the storage buffer. For example, if the storage buffer contains nine storage locations, the maximum value of the binary address symbol is seventeen. Each storage location in the storage buffer thus has two corresponding binary address symbols. For example, the third storage location can be addressed using a binary address symbol 0010 or 1010 (binary representations of 2 and 10, respectively). For each data unit (e.g., a bit, a byte, or a word) is written to a storage location in the storage buffer, the binary address symbol is incremented by one. When the ninth storage location has been used, the binary address symbol continues to be incremented until reaching the maximum value of seventeen.

To address a particular storage location using the binary address symbol, the device determines whether the binary address symbol is greater than or equal to the number of storage locations in the storage buffer. If so, then the number of storage locations is subtracted from the binary address symbol to obtain a pointer or address of the particular storage location. Otherwise, the binary address symbol itself is used as the pointer or address of the particular storage location.

FIG. 1 is a block diagram illustrating components of a network device 100 and data flow therebetween for writing data to, and reading data from, a storage buffer 110 having an odd number (n=2K−1, where K is a non-zero integer) of storage locations 110a-110n, according to some implementations described herein. Network device 100 is logically divided into a write side 102 and a read side 104. Write side 102 includes write-side control circuitry 112 and read side 104 includes read-side control circuitry 134. Storage buffer 110 is accessible from both write side 102 and read side 104 and serves to transport data from write side 102 to read side 104. Storage buffer 110 has an odd number of locations 110a-110n at which data can be stored. Upon assertion of a not-full signal, external components may write data to the storage buffer 110. Data 106 received at the network device 100, for example from a computer network (not shown), is stored in the storage buffer 110, in an implementation. Write-enable signal 108 informs storage buffer 110 of the incoming data 106. Write-enable signal 108 also informs control circuitry 112, at binary address symbol counter 114, of the incoming data. Binary address symbol counter 114 transmits a signal 116 indicating which storage locations of the storage buffer are full. Alternatively or additionally, binary address counter circuitry 114 may transmit the not-full signal.

Binary address symbol counter 114 also transfers a binary address symbol 118 corresponding to a location of the storage buffer 110 at which the incoming data 106 should be written to write pointer logic circuitry 120. Write pointer logic circuitry 120 determines, based on the binary address symbol, a pointer corresponding to a storage location of storage buffer 110. For example, write pointer logic circuitry 120 compares the value of the binary address symbol with the number of storage locations in the storage buffer. If the binary address symbol is greater than or equal to the number of storage locations in the storage buffer, then write pointer logic circuitry 120 subtracts the number of storage locations from the binary address symbol to obtain a pointer to the corresponding storage location. If the binary address symbol is less than the number of storage locations, then write pointer logic circuitry 120 uses the binary address symbol as the pointer to the corresponding storage location. Write pointer logic circuitry 120 transmits the pointer 122 to storage buffer 110 as a control signal to store data 106 is the corresponding storage location.

Binary address symbol counter 114 also transmits the binary address symbol 124 to offset addition circuitry 126. Offset addition circuitry 126 determines an offset value to add to the binary address symbol before conversion of the binary address symbol into a Gray code symbol. Offset addition circuitry 126 selects the smallest power of two that is greater than the number of storage locations in storage buffer 110. For example, if storage buffer 110 contains nine storage locations, offset addition circuitry will select sixteen, as it is the smallest power of two that is greater than nine. Offset addition circuitry then subtracts the number of locations in storage buffer 110 from the selected power of two to determine the offset value. Thus, in the example above, the offset value is seven. Offset addition circuitry 126 then adds the offset value to the binary address symbol and transmits the sum 128 to binary-to-Gray code conversion circuitry 130.

Binary-to-Gray code conversion circuitry 130 converts the binary address symbol to a corresponding Gray code symbol. The Gray code is a sequence of symbols in which the value of a respective symbol changes by only one bit from the respective value of the immediately preceding symbol. For example, the number 1 is represented as a 4-bit binary value is 0001 and the number 2 is represented as 0010. Progressing from 1 to 2 using binary values results in changing two bits. The Gray code, however, changes only a single bit between consecutive values. Thus, while the Gray code representation of the number 1 is still 0001, the Gray code representation of the number 2 is 0011. The Gray code includes an even number of symbols arranged in a sequence. The most significant bit of each symbol of the first half of the sequence is 0, and the most significant bit of each symbol in the second half of the sequence is 1. The remaining bits of the first symbol of the sequence are identical to the remaining bits of the last symbol of the sequence. The remaining bits of each successive (i.e., from first to last) symbol of the first half of the sequence are also identical to the remaining bits of each regressive (i.e., from last to first) symbol of the second half of the sequence. For example, in a 10-symbol sequence with each symbol being four bits in length, the last three bits of the first and tenth symbols have the same values. The last three bits of the second and ninth symbols also have the same values. This pattern continues for each symbol in equidistant positions from each end of the sequence.

In systems according to implementations of the current disclosure, the Gray code has a length equal to twice the selected power of two, but several symbols are not used. Continuing the above example, an offset value of seven is added to a binary address symbol, such as the first binary address symbol of 0000 (corresponding to the $0^{th}$ storage location in storage buffer 110). The resulting sum, represented as 0111, is converted to the eighth Gray code symbol in the thirty-two-symbol sequence. The first seven symbols, as well as the last seven symbols, are not used because of the offset value.

Binary-to-Gray code conversion circuitry 130 converts the binary code symbol to a Gray code symbol, as described above. The Gray code symbol 132 corresponding to the binary code symbol is transferred to read side 104, where it is received by read-side control circuitry 134. Read-side control circuitry 134, using Gray-code-to-binary conversion circuitry 136, converts the Gray code symbol back to the corresponding binary value representing the sum of the binary address symbol and the offset value and transfers the binary value 138 to offset subtraction circuitry 140.

Offset subtraction circuitry 140 may determine the offset value using the same methods as described above in connection with offset addition circuitry 126. Alternatively, offset addition circuitry 126 may transfer the offset value to the read side via a control channel. Offset subtraction circuitry 140 subtracts the offset value from the binary value to resolve the binary address symbol and transfers the binary address symbol 142 to binary address symbol counter 144. Binary address symbol counter 144 asserts a signal 146 indicating to other read-side components which storage locations in storage buffer 110 contain data to be read. Binary address symbol counter 144 calculates, based on the binary address symbol, the number of storage locations in the storage buffer containing data available to be read.

Read-side control circuitry 134 receives a read request 148 which contains a binary address symbol. Read-side control circuitry 134, using read pointer logic circuitry 150, determines the storage location to which the binary address symbol corresponds. Read pointer logic circuitry may accomplish this by using methods described above in connection with write pointer logic circuitry 120. Read pointer logic circuitry 150 transmits a pointer 152 to the storage location in storage buffer 110 to storage buffer 110. In response, storage buffer 110 transmits data 154 to the component on the read side from which the read request originated.

Figure 2:
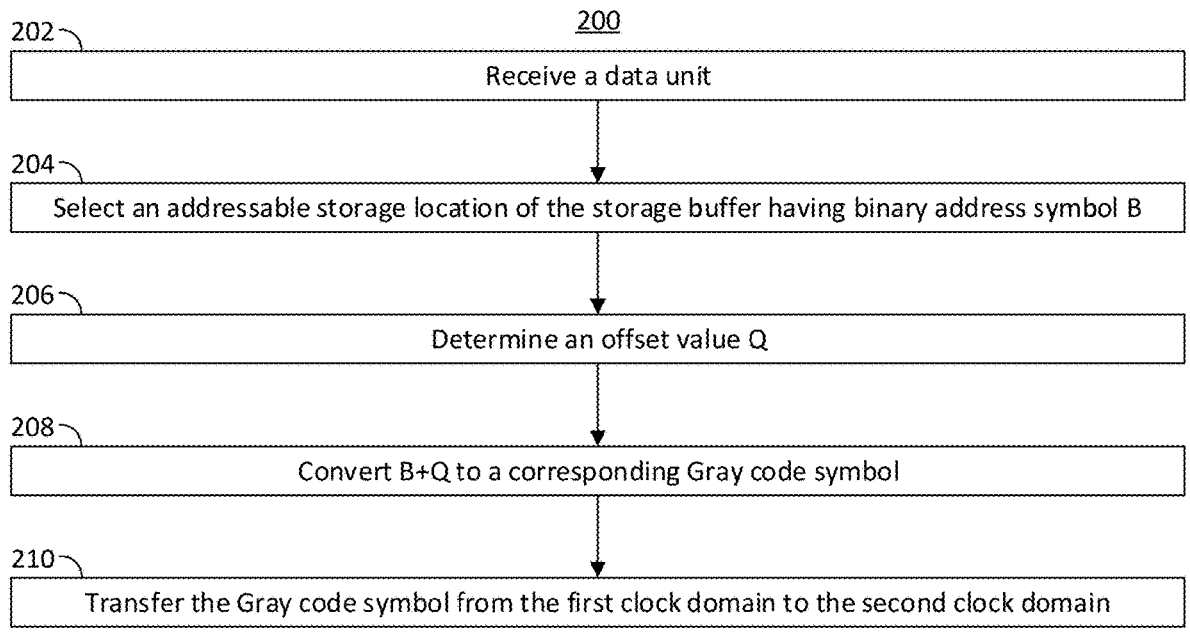
FIG. 2 is a flowchart representing a process for generating a Gray code symbol corresponding to a binary address symbol in accordance with some implementations of the subject matter of the present disclosure.

FIG. 2 is a flowchart representing a process 200 for generating a Gray code symbol corresponding to one of an odd number of data storage locations, according to some implementations disclosed herein. At 202, network device 100 receives a data unit from an external component for storage in a storage location in storage buffer 110. At 204, write-side control circuitry 112 selects an addressable storage location of storage buffer 110 having a binary address symbol B. For example, write-side control circuitry 112, using binary address symbol counter 114, selects a storage location in storage buffer 110 in which to store the data. At 206, write-side control circuitry 112, using offset addition circuitry 126, determines an offset value Q, as described above in connection with FIG. 1.

At 208, the sum of the binary address symbol B and the offset value Q is converted to a corresponding Gray code symbol and, at 210, the Gray code symbol is transferred from the write side to the read side.

Figure 3:
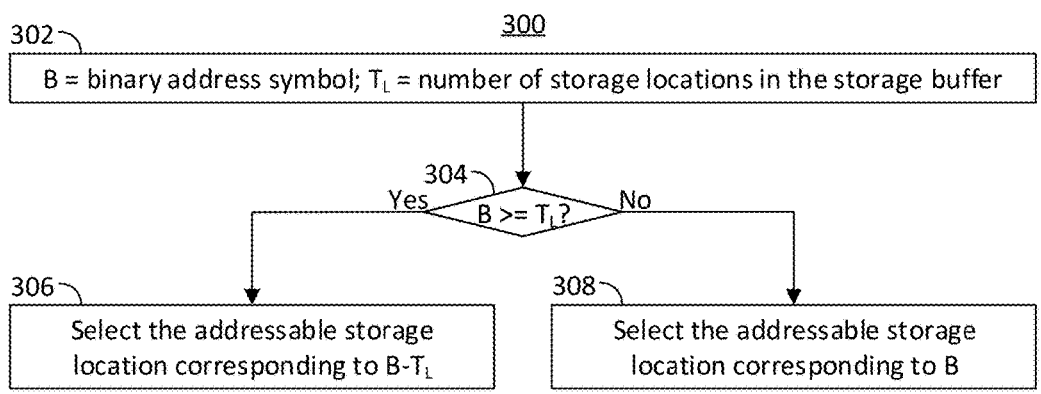
FIG. 3 is a flowchart representing a process for selecting a storage location to which to write data based on a binary address symbol in accordance with some implementations of the subject matter of the present disclosure.

FIG. 3 is a flowchart representing a process 300 for selecting a storage location to which to write data, according to some implementations disclosed herein. At 302, write pointer logic circuitry 120 retrieves the binary address symbol B and the total number of storage locations $T_L$, in storage buffer 110. At 304, write pointer logic circuitry 120 determines whether B is greater than or equal to $T_L$. If so, then, at 306, write pointer logic circuitry selects the storage location corresponding to the difference of B and $T_L$. For example, if the binary address symbol B is 1011, or 11, and the storage buffer contains nine locations, write pointer logic circuitry 120 selects the storage location corresponding to a pointer value of 0010, or 2. If B is less than $T_L$, then, at 308, write pointer logic circuitry 120 selects the storage location corresponding to the value of B.

Figure 4:
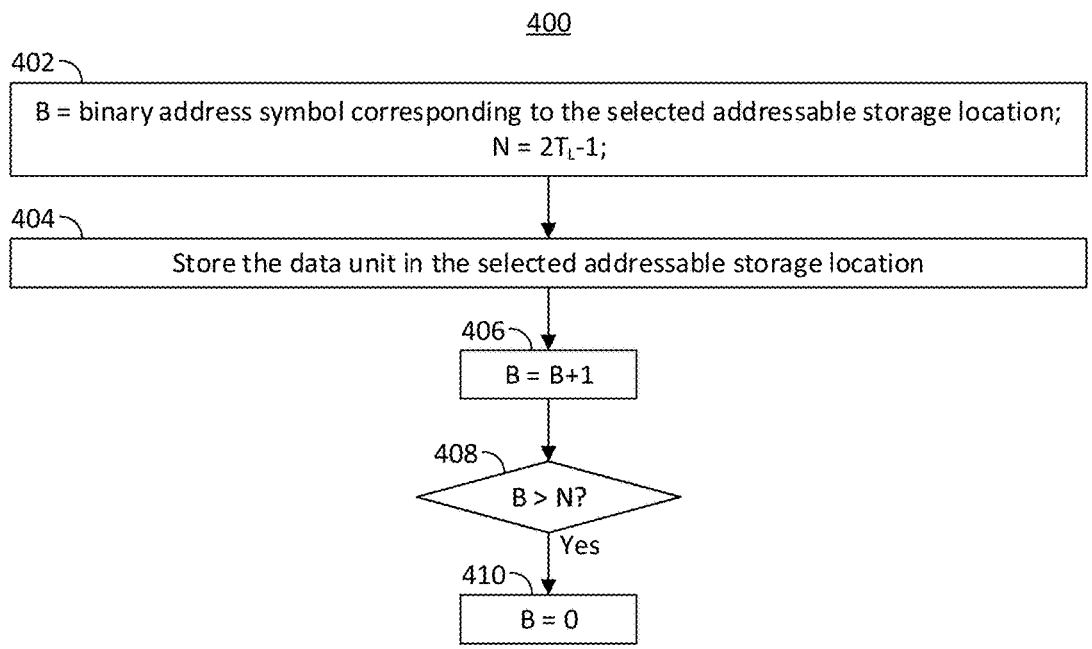
FIG. 4 is a flowchart representing a process for updating a binary address symbol counter in accordance with some implementations of the subject matter of the present disclosure.

FIG. 4 is a flowchart representing a process 400 for updating a binary address symbol counter, according to some implementations disclosed herein. At 402, write-side control circuitry 112 retrieves the binary address symbol B corresponding to the selected addressable storage location, and sets a variable N to one less than twice the number of storage locations in storage buffer 110 ($T_L$). At 404, network device 100 stores data 106 in storage buffer 110 at the storage location corresponding to the binary address symbol B. At 406, write-side control circuitry 112, using binary address symbol counter 114, increments the binary address symbol B by one. At 408, binary address symbol counter 114 determines whether B is greater than N. If so, then, at 410, binary address symbol counter 114 resets the value of the binary address symbol B to zero.

Figure 5:
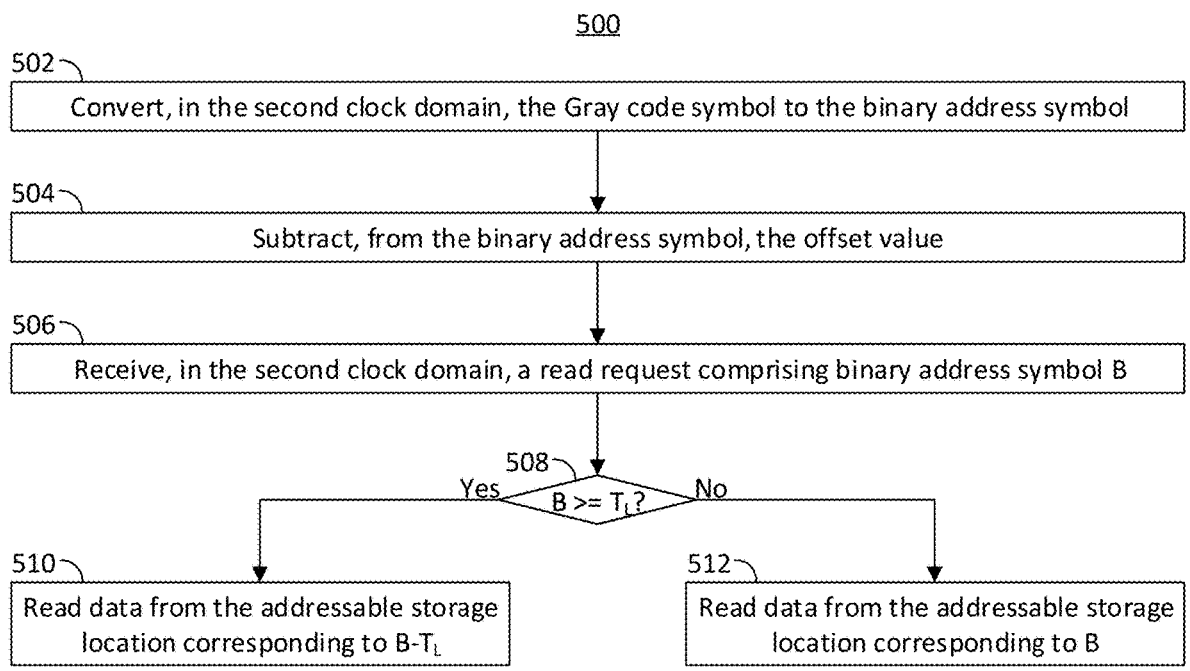
FIG. 5 is a flowchart representing a process for selecting a storage location from which to read data based on a binary address symbol in accordance with some implementations of the subject matter of the present disclosure.

FIG. 5 is a flowchart representing a process 500 for selecting a storage location from which to read data, according to some implementations disclosed herein. At 502, read-side control circuitry 134, using Gray code to binary conversion circuitry 136, converts the Gray code symbol to the binary address symbol. At 504, offset subtraction circuitry 140 subtracts, from the binary address symbol, the offset value. At 506, read-side control circuitry 134 receives a read request comprising a binary address symbol B. At 508, read-side control circuitry 134, using read pointer logic circuitry 150, determines whether the value of B is greater than or equal to the number of storage locations IL in storage buffer 110. If so, then, at 510, read pointer logic circuitry 150 transmits a signal 152 to storage buffer 110 to read data from the storage location corresponding to the difference of B and IL. If B is less than $T_L$, then, at 512, read pointer logic circuitry 150 transmits a signal 152 to storage buffer 110 to read data from the storage location corresponding to the value of B.

Various implementations discussed in conjunction with FIGS. 1-5 are performed by various electronic components of one or more electronic circuits, such as but not limited to an integrated circuit, an application-specific integrated circuit (ASIC), a field-programmable gate array (FPGA), and/or the like. Various components discussed throughout this disclosure may be configured to include a set of electronic circuit components, and communicatively operate on one or more electronic circuits. Each electronic circuit may be configured to include any of, but not limited to logic gates, memory cells, amplifiers, filters, and/or the like. Various implementations and components disclosed herein may be configured to be at least partially operated and/or implemented by processor-executable instructions stored on one or more transitory or non-transitory processor-readable media.

While various implementations of the subject matter of the present disclosure have been shown and described herein, such implementations are provided by way of example only. Numerous variations, changes, and substitutions relating to implementations described herein are applicable without departing from the disclosure. It is noted that various alternatives to the implementations of the disclosure described herein may be employed in practicing the disclosure. It is intended that the following claims define the scope of the disclosure and that methods and structures within the scope of these claims and their equivalents be covered thereby.

While operations are depicted in the drawings in a particular order, that is not to be construed as requiring that such operations be performed in the particular order shown or in sequential order, or that all illustrated operations must be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 2 does not necessarily require the particular order shown, or sequential order, to achieve desirable results. In certain implementations, multitasking and parallel processing may be advantageous. Other variations are within the scope of the following claims.

What is claimed is:

1. A method for storing data units in a network device having a plurality of clock domains, the method comprising:
    receiving, from a client device disposed in a first clock domain, a data unit for access by a device disposed in a second clock domain operating asynchronously from the first clock domain;
    selecting an addressable storage location of a storage buffer, the addressable storage location corresponding to a binary address symbol, wherein:
        the storage buffer comprises an odd number of storage locations,
        the binary address symbol has a maximum value equal to one less than twice the odd number of storage locations, and
        storage locations are selected sequentially;

determining an offset value;

converting the sum of the binary address symbol and the offset value to a corresponding pointer; and transferring the pointer from the first clock domain to the second clock domain.

2. The method of claim 1, wherein selecting an addressable storage location of the storage buffer comprises:

retrieving the value of the binary address symbol, wherein the binary address symbol is a zero-based binary number; and determining whether the binary address symbol is greater than or equal to the number of storage locations in the storage buffer.

3. The method of claim 2, further comprising:

in response to determining that the binary address symbol is greater than or equal to the number of storage locations in the storage buffer, selecting the addressable storage location corresponding to the difference of the binary address symbol and the number of storage locations in the storage buffer; and in response to determining that the binary address symbol is less than the number of storage locations in the storage buffer, selecting the addressable storage location corresponding to the binary address symbol.

4. The method of claim 1, further comprising:

storing the data unit in the selected addressable storage location;

incrementing the value of the binary address symbol, wherein the binary address symbol is a zero-based binary number;

determining whether the incremented value of the binary address symbol is greater than one less than twice the number of storage locations in the storage buffer;

in response to determining that the incremented value of the binary address symbol is greater than one less than twice the number of storage locations in the storage buffer, resetting the value of the binary address counter to zero.

5. The method of claim 1, further comprising:

converting, in the second clock domain, the pointer to a reconstructed binary address symbol; and subtracting, from the reconstructed binary address symbol, the offset value.

6. The method of claim 5, further comprising:

receiving, in the second clock domain, from a component in the second clock domain, a read request comprising a particular binary address symbol;

determining whether the value of the particular binary address symbol is greater than or equal to the number of storage locations in the storage buffer.

7. The method of claim 6, further comprising:

in response to determining that the value of the particular binary address symbol is greater than or equal to the number of storage locations in the storage buffer, reading data from the storage location corresponding to the difference of the particular binary address symbol and the number of storage locations in the storage buffer; and in response to determining that the value of the particular binary address symbol is less than the number of storage locations in the storage buffer, reading data from the storage location corresponding to the value of the particular binary address symbol.

8. The method of claim 1, wherein transferring the pointer from the first clock domain to the second clock domain comprises transmitting the pointer from a component in the first clock domain over a control channel.

9. The method of claim 1, wherein determining the offset value comprises:

determining a power of two that is greater than the number of storage locations in the storage buffer; and subtracting, from the power of two, the number of storage locations in the storage buffer.

10. The method of claim 1, further comprising, in the second clock domain:

receiving the pointer;

converting the pointer to a reconstructed binary address symbol;

determining, based on the reconstructed binary address symbol, a number of storage locations in the storage buffer containing data; and in response to determining that the number of storage locations in the storage buffer containing data is greater than zero, asserting a signal indicating that data is available to be read.

11. The method of claim 1, wherein the pointer is a Gray code symbol.

12. A network device storing data units received from a network, the device comprising:

a storage buffer having an odd number of storage locations; and first control circuitry residing in a first clock domain and configured to:

receive, from a client device disposed in the first clock domain, a data unit for access by a device disposed in a second clock domain operating asynchronously from the first clock domain;

select an addressable storage location of the storage buffer, the addressable storage location corresponding to a binary address symbol, wherein:

the binary address symbol has a maximum value equal to one less than twice the odd number of storage locations, and storage locations are selected sequentially;

determine an offset value;

convert the sum of the binary address symbol and the offset to a corresponding pointer; and transfer the pointer from the first clock domain to the second clock domain.

13. The network device of claim 12, wherein the first control circuitry configured to select an addressable storage location of the storage buffer is configured to:

retrieve the value of the binary address symbol, wherein the binary address symbol is a zero-based binary number; and determine whether the binary address symbol is greater than or equal to the number of storage locations in the storage buffer.

14. The network device of claim 13, wherein the first control circuitry is further configured to:

in response to determining that the binary address symbol is greater than or equal to the number of storage locations in the storage buffer, selecting the addressable storage location corresponding to the different of the binary address symbol and the number of storage locations in the storage buffer; and in response to determining that the binary address symbol is less than the number of storage locations in the storage buffer, selecting the addressable storage location corresponding to the binary address symbol.

15. The network device of claim 12, wherein the first control circuitry is further configured to:

store the data unit in the selected addressable storage location;

increment the value of the binary address symbol, wherein the binary address symbol is a zero-based binary number;

determine whether the incremented value of the binary address symbol is greater than on less than twice the number of storage locations in the storage buffer;

in response to determining that the incremented value of the binary address symbol is greater than one less than twice the number of storage locations in the storage buffer, reset the value of the binary address symbol to zero.

16. The network device of claim 12, further comprising second control circuitry residing in the second clock domain and configured to:

convert the pointer to a reconstructed binary address symbol; and subtract, form the reconstructed binary address symbol, the offset value.

17. The network device of claim 16, wherein the second control circuitry is further configured to:

receive, from a component in the second clock domain, a read request comprising a particular binary address symbol;

determine whether the value of the particular binary address symbol is greater than or equal to the number of storage locations in the storage buffer.

18. The network device of claim 17, wherein the second control circuitry is further configured to:

in response to determining that the value of the particular binary address symbol is greater than or equal to the number of storage locations in the storage buffer, read data from the storage location corresponding to the difference of the particular binary address symbol and the number of storage locations in the storage buffer; and in response to determining that the value of the particular binary address symbol is less than the number of storage locations, read data from the storage location corresponding to the value of the particular binary address symbol.

19. The network device of claim 12, wherein the first control circuitry configured to transfer the pointer from the first clock domain to the second clock domain is configured to transmit the pointer over a control channel.

20. The network device of claim 12, wherein the first control circuitry configured to determine the offset value is configured to:

determine a power of two that is greater than the number of storage locations in the storage buffer; and subtract, from the power of two, the number of storage locations in the storage buffer.

21. The network device of claim 12, further comprising second control circuitry residing in the second clock domain and configured to:

receive the pointer;

convert the pointer to a reconstructed binary address symbol;

determine, based on the reconstructed binary address symbol, a number of storage locations in the storage buffer containing data; and in response to determining that the number of storage locations in the storage buffer containing data is greater than zero, assert a signal indicating that data is available to be read.

22. The network device of claim 12, wherein the pointer is a Gray code symbol.

* * * * *